US008161227B1

(12) United States Patent
Diggs et al.

(10) Patent No.: US 8,161,227 B1
(45) Date of Patent: Apr. 17, 2012

(54) STORAGE SUBSYSTEM CAPABLE OF PROGRAMMING FIELD-PROGRAMMABLE DEVICES OF A TARGET COMPUTER SYSTEM

(75) Inventors: Mark S. Diggs, Laguna Hills, CA (US); David E. Merry, Jr., Irvine, CA (US)

(73) Assignee: SiliconSystems, Inc., Aliso Viejo, CA (US)

( * ) Notice: Subject to any disclaimer, the term of this patent is extended or adjusted under 35 U.S.C. 154(b) by 629 days.

(21) Appl. No.: 11/554,453

(22) Filed: Oct. 30, 2006

(51) Int. Cl.
*G06F 12/00* (2006.01)
(52) U.S. Cl. ........ 711/103; 711/102; 711/100; 711/108; 711/154; 711/4; 714/746; 714/747; 369/47.27; 369/47.34; 365/185.33; 365/185.14; 365/189.01; 365/234; 365/236
(58) Field of Classification Search .............. 711/102, 711/100, 103, 108, 154, 4; 365/185.33, 185.29, 365/185.14, 189.01, 234, 236; 707/202, 707/203; 714/746, 747; 369/47.27, 47.34
See application file for complete search history.

(56) References Cited

U.S. PATENT DOCUMENTS

| 5,847,577 | A | 12/1998 | Trimberger | |
|---|---|---|---|---|
| 6,961,819 | B2* | 11/2005 | Intrater et al. ................. | 711/123 |
| 7,003,619 | B1* | 2/2006 | Moore et al. ................... | 711/102 |
| 2005/0062497 | A1 | 3/2005 | Pellizzer et al. | |
| 2006/0038586 | A1 | 2/2006 | Xia et al. | |
| 2006/0100723 | A1 | 5/2006 | Sun et al. | |
| 2006/0139053 | A1 | 6/2006 | Speers | |
| 2009/0147570 | A1* | 6/2009 | Cornwell et al. .......... | 365/185.2 |
| 2010/0146202 | A1* | 6/2010 | Nystad et al. .................. | 711/108 |

OTHER PUBLICATIONS

Knipper, G., *System ACE Configuration Solutions for Xilinx FPGAs*, White Paper: System ACE, XILINX WP151 (v2.0), May 18, 2006.
XILINX System ACE Configuration Solutions FAQ Brochure.
Advance Product Specification for XILINX System ACE CompactFlash Solution, DS080 (v1.5), Apr. 5, 2002.

* cited by examiner

*Primary Examiner* — Midys Rojas
(74) *Attorney, Agent, or Firm* — Knobbe Martens Olson & Bear LLP

(57) ABSTRACT

A non-volatile storage subsystem is capable of serving as a configuration controller for configuring/programming one or more field-programmable devices, such as FPGAs, of a target computer system. The storage subsystem may be in the form of a memory card or drive that plugs into a standard slot or external port of the target system. When connected to the target system, the storage subsystem uses the appropriate download interface/protocol to stream or otherwise send configuration data stored in its non-volatile storage to the target system's field-programmable device(s). Thus, the need for a configuration controller in the target system is avoided. Once the configuration process is complete, the storage subsystem preferably acts as a standard storage subsystem, such as an ATA storage drive, that may be used by the target system to store data.

32 Claims, 3 Drawing Sheets

STORAGE SUBSYSTEM CAPABLE OF PROGRAMMING FIELD-PROGRAMMABLE DEVICES OF A TARGET COMPUTER SYSTEM

BACKGROUND

1. Field of the Invention

The present invention relates to the use of a storage subsystem to configure one or more field-programmable devices of a target computer system.

2. Description of the Related Art

A field programmable gate array (FPGA) is a semiconductor device that contains programmable logic components and associated interconnects. As opposed to application-specific integrated circuits (ASICs), which are manufactured to implement specific circuit logic, a designer may program a pre-manufactured FPGA to implement a particular logic circuit. FPGAs are one example of a type of field-programmable device. Other types of field-programmable devices include Complex Programmable Logic Devices (CPLDs), Electrically Erasable Programmable Read-Only Memory devices (EEPROMs), Field Programmable Object Arrays (FPOAs), Field Programmable Analog Arrays (FPAAs) and flash-based microcontrollers.

A target system that includes one or more field-programmable devices typically includes some type of internal configuration device or logic that controls the programming process. For example, some systems include an EEPROM that streams configuration data to the system's field-programmable devices upon power-up of the system. As another example, systems based on the Xilinx System ACE™ product include a special ASIC that controls the transfer of configuration data from an IDE storage device to system's FPGAs. These configuration devices contribute significantly to the cost and complexity of the target system, and consume valuable board real estate.

SUMMARY

The present invention comprises non-volatile storage subsystem capable of serving as a configuration controller for configuring/programming one or more field-programmable devices, such as FPGAs, of a target computer system. The storage subsystem may be in the form of a memory card or drive that plugs into a standard slot or external port of the target system. When connected to the target system, the storage subsystem uses the appropriate download interface/protocol to stream or otherwise send configuration data stored in its non-volatile storage to the target system's field-programmable device(s). Thus, the need for a configuration controller in the target system is avoided. Once the configuration process is complete, the storage subsystem preferably acts as a standard storage subsystem, such as an ATA storage drive, that may be used by the target system to store data. The storage subsystem may also include one or more features for protecting the configuration data from unauthorized access.

The invention also comprises a target system that is adapted to be configured by a storage subsystem as described above.

Neither this summary nor the following detailed description purports to define the invention. The invention is defined by the claims.

BRIEF DESCRIPTION OF THE DRAWINGS

Systems and methods which embody the various features of the invention will now be described with reference to the following drawings, in which.

DETAILED DESCRIPTION OF SPECIFIC EMBODIMENTS

Specific embodiments of the invention will now be described with reference to the drawings. This description is intended to illustrate example implementations of, and applications for, the present invention, and is not intended to be limiting. For instance, in the specific embodiments described herein, the target system includes one or more FPGAs that are configured/programmed via the storage subsystem. In other embodiments, the target system may additionally or alternatively include another type of field-programmable device that is programmed by the storage subsystem, such as a Complex Programmable Logic Device (CPLD), an Electrically Erasable Programmable Read-Only Memory (EEPROM), a flash-based microcontroller, a software-configurable microprocessor such as the Stretch S500, a Field Programmable Object Array (FPOA), a Field Programmable Analog Array (FPAA), or a combination of the foregoing.

As another example, although the storage subsystem in the illustrated embodiments uses a solid-state non-volatile memory to store the configuration data, other types of non-volatile storage, such as magnetic disk drive storage, may be included in the storage subsystem and used for this purpose. As yet another example, although the storage subsystem described below is capable of acting as an ATA storage device, this aspect of the design is not required.

Thus, nothing in this detailed description is intended to imply that any particular feature, characteristic or component is essential to the invention. The invention is defined only by the claims.

I. Overview (FIG. 1)

Figure 1:
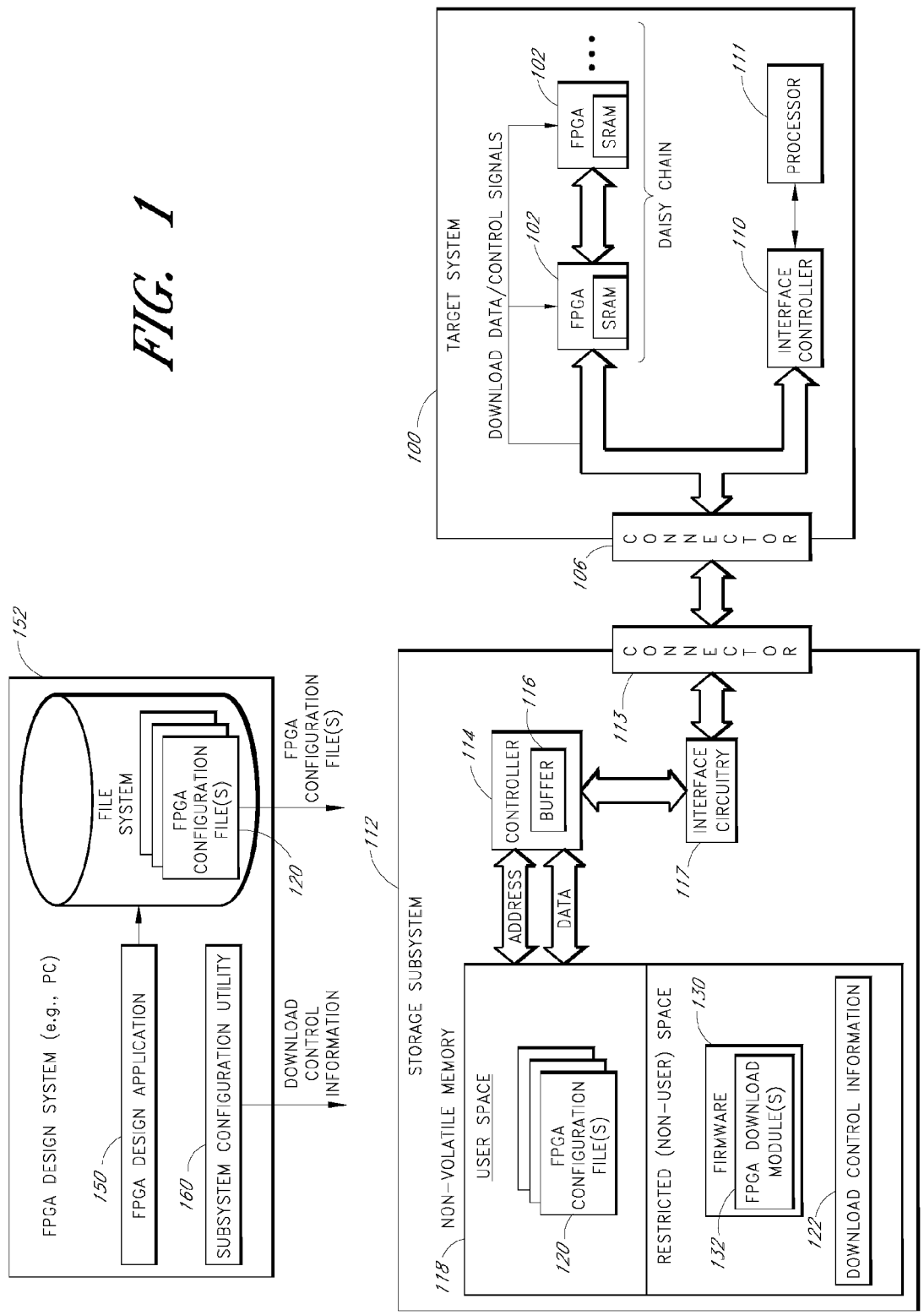
FIG. 1 is a block diagram illustrating a storage subsystem, a target system, and a design system according to one embodiment of the invention.

FIG. 1 illustrates the components involved in one embodiment of the invention. In this embodiment, the target system 100 includes one or more FPGA devices 102 (FPGAs) that are configurable using a detachable storage subsystem 112. Commercially available FPGAs available from such Xilinx, Altera, Actel and others may be used. As is conventional, each FPGA 102 implements a download interface for receiving configuration information (typically in the form of a configuration bitstream), and includes SRAM for storing this information. Different download interfaces and protocols are typically used by different types and brands of FPGA devices, and the design is not limited to any particular download interface or protocol.

As illustrated in FIG. 1, the target system 100 includes an external connector 106 that is used to attach the storage subsystem 112. This connector 106 may be an industry-standard connector such as a USB, SATA (Serial ATA), PC Card/PCMCIA, PCI Express, Firewire (IEEE 1394), Parallel ATA (PATA), CompactFlash (CF), Secure Digital (SD), or Memory Stick connector (among others), and may be part of an associated port or slot. The connector 106 is connected by a set of signal lines to an interface controller 110 and at least one FPGA device 102 (two shown). The interface controller 110 preferably implements the signal interface corresponding to the connector 106. The interface controller 110 may, for example, be implemented as a microcontroller that includes a built-in signal interface for the relevant interface standard, or, as described below, may be implemented in one of the FPGAs. The target system 100 also includes a processor 111, such as a microprocessor, a microcontroller or an ASIC, that sends storage access commands (typically ATA commands) to the storage subsystem via the interface controller 110.

If the target system 100 includes multiple FPGAs 102, they may be interconnected in a conventional daisy chain arrangement as shown. With such an arrangement, the FPGA configuration data is "streamed" to the daisy chain arrangement, and passed from one FPGA to the next, as needed to configure the FPGAs. Although a daisy chain arrangement is illustrated, the FPGAs may be coupled to the external connector 106 in another manner, such as via a multiplexer that enables configuration data to be sent to one FPGA at a time.

The target system 100 may also include various other components (e.g., a network interface, RAM, a power supply, various busses, etc.) typically included in FPGA-based computer systems. In a typical application, the target system 100 is network router or other specialized computing device that implements custom functions not available in off-the-shelf components.

An important aspect of the illustrated embodiment is that no special hardware or software in needed in the target system 100 to configure the FPGAs. This is in contrast to systems based on the Xilinx System ACE™ product, in which a special ASIC is used in the target system to handle the transfer of the configuration data to the FPGAs. Another benefit is that the design does not require the use of any particular brand or type of FPGA device. Yet another benefit is that the configuration information can be transferred directly from the storage subsystem 112 to the FPGA(s) 102 without intermediate storage within the target system; this enables the FPGA(s) to be programmed more rapidly, and potentially reduces the quantity of RAM needed in the target system.

The storage subsystem 112 is preferably a detachable, portable storage device having a connector 113 that mates with the target system's connector 106. (The storage subsystem 112 and target system may alternatively communicate via a wireless interface, such as Bluetooth, in which case the physical connectors 106, 113 may be omitted.) The storage subsystem 112 may, but need not, have a standard form factor such as a CF, PC Card, MultiMediaCard, SmartMedia, Memory Stick, SecureDigital or hard disk drive form factor.

As shown in FIG. 1, the storage subsystem 112 includes a controller 114 that is coupled to a non-volatile memory array 118 by a set of address and data lines. The controller is preferably implemented as a processor that executes a firmware program, but may alternatively be implemented solely in application-specific circuitry without using firmware. The controller 114 includes or is connected to a buffer 116 used for data transfers, and is connected to the connector 113 via appropriate interface circuitry 117.

The non-volatile memory (NVM) array 118 is implemented in solid state storage, such as NAND or NOR flash memory chips. As mentioned above, other types of non-volatile storage devices, such as disk drives, may additionally or alternatively be used. As illustrated in FIG. 1, the NVM array is preferably divided into user data space and restricted (non-user) data space. The user data space (also referred to as the "user memory area") is the portion of the NVM array that is exposed to other devices via standard IDE/ATA commands. (The storage subsystem may alternatively behave as another type of storage device, such as a SCSI device.) This area is used to store the FPGA configuration file or files 120 that are used to configure the target system 100. As explained below, these configuration files 120 may be created with a conventional FPGA design application 150 and then copied over to the storage subsystem. The user space may also be made available as a general storage resource to the target system and/or other host systems. The storage subsystem 112 preferably implements an industry-standard file system, such as FAT 16 or FAT 32, to store files in the user space.

The user data space may also store program files that are executed by the target system 100 following the configuration process. For example, the user data space may include an operating system or an application that is executed by the target system's processor 111 once the FPGA(s) have been configured.

Unlike the user data space, the restricted (non-user) space (also referred to as the "restricted memory area") is not exposed via standard ATA commands to host systems. Some or all of the restricted memory space is preferably accessible to host systems via one or more non-standard vendor-specific ATA commands. As illustrated in FIG. 1, the restricted space stores firmware 130 executed by the controller 114. This firmware 130 preferably includes one or more FPGA download modules 132 that embody the download interface or interfaces and associated data transfer protocols used to download the FPGA configuration file(s) 120 to the FPGA(s) 102. Different FPGA download modules 132 may be included for implementing different FPGA download interfaces, such as the download interfaces used by different types and brands of FPGAs. Alternatively, the appropriate FPGA download module may be written to the storage subsystem 112 with the FPGA configuration files when the storage subsystem 112 is configured to work with a particular target system 100. Further, a single FPGA download module that supports multiple download interfaces may be used. In other embodiments, the FPGA download interfaces may be partially or wholly implemented in application-specific circuitry (e.g., an ASIC) of the storage subsystem 112.

As further illustrated in FIG. 1, the restricted memory space is also preferably used to store download control information 122. The download control information 122 preferably specifies the particular download interface to be used by the controller 114 to configure a particular type of target system 100 or FPGA. For example, the download control information 122 may include a download interface identifier that identifies the particular FPGA download interface used by the target system's FPGA(s), and/or may include parameters that define the data transfer protocol to be used to implement this download interface. The download control information 122 may also include other types of parameters that specify, e.g., the sizes and locations of the configuration files 120, and the number of FPGAs to be configured.

The download control information 122 may be written to the restricted memory space using one or more vendor-specific commands when the storage subsystem 112 is configured for use with a particular type of target system or FPGA. This allows the storage subsystem 112 to be configured for use with a particular type of FPGA without the need to update the firmware 118. However, as mentioned above, the task of configuring the storage subsystem 112 to work with a particular type of FPGA may alternatively be accomplished via a firmware update. Yet another option is to embed some or all of the download control information in the FPGA configuration file(s) 120, as explained below. If stored in the restricted memory space as shown, the download control information 122 is stored in a dedicated location (e.g., in a special sector), and in a defined format, that is known to the controller 114.

In operation, when the storage subsystem 112 is connected to the target system 100 and the target system is powered up, the storage subsystem 112 boots up and then enters into an FPGA configuration mode. (This process is described in further detail below with reference to the flow diagrams.) While in this mode, the controller 114 uses the FPGA download interface specified by the download control information 122 to stream the FPGA configuration file(s) 120 from the user space to the FPGA(s) 102. As explained below, the storage subsystem 112 preferably asserts a BUSY signal to the target's interface controller 110 during this process to inhibit ATA-based communications between the storage subsystem 112 and the target system 100. This enables the signal lines exposed via the two external connectors 106, 113 to be used temporarily to implement the FPGA download interface and protocol. Once the transfer is complete, the storage subsystem's controller 114 preferably de-asserts the BUSY signal and begins to behave as an ordinary ATA storage device (e.g., an IDE, ATA-2, ATA-3, Ultra-ATA, ATA/66, ATA/100 or SATA disk drive). Thus, once the FPGA configuration process is complete, the storage subsystem 112 becomes available to the target system 100 as a read/write storage resource, and the same signal lines that were used for FPGA configuration are now used to carry ATA storage access commands and responses.

FIG. 1 also depicts one example of how the storage subsystem 112 can be appropriately configured with one or more configuration files 120 and associated download control information 122. In this particular example, the FPGA configuration file or files 120 are created using a conventional FPGA design application 150 that runs on an FPGA design system 152, such as a PC. These configuration files 120 ordinarily do not specify or correspond to any particular FPGA download interface. Once created, the user connects the storage subsystem 112 to the design system 152 and copies (e.g., drags and drops) the configuration file(s) from the file system of the design system 152 to the file system of the storage subsystem 112.

The user may also optionally launch a separate subsystem configuration utility program 160 on the design system 152 to configure the storage subsystem 112 with information for implementing the appropriate FPGA download interface. This utility program 160 may alternatively be launched automatically when, e.g., the user connects the storage subsystem 112 to the design system 152. This utility 160 provides a user interface through which the user can specify the particular type of FPGA device or device interface to be used to handle the subsequent download process. Once the user has explicitly or implicitly specified the FPGA download interface, the utility 160 uses one or more vendor-specific commands to write the download control information 122 and/or the appropriate FPGA download module(s) 132 to the storage subsystem's restricted space.

In other embodiments, the configuration utility 160 may encode or embed some or all of the download control information 122 in the configuration file(s) 120. In such embodiments, the controller 114 may strip out this information from the configuration file(s) 120 during the transfer process. As discussed below, the configuration utility 160 may also be capable of encrypting the configuration files 160 for storage on the storage subsystem 112 so that trade secrets embodied in such files are protected.

As will be appreciated, various other methods for configuring the storage subsystem 112 are possible. For example, the configuration files 120 may be transferred from the design system 152 to the storage subsystem 112 via a network and/or one or more intermediate computers. Further, the functionality of the configuration utility 160 could be implemented within the FPGA design application 150.

The configuration file or files 120 may be stored on the storage subsystem 112 in the same file format, and using the same type of file system (e.g., FAT 32), as on the design system. Thus, an FPGA designer can easily access and make changes to these configuration files via a host system. As discussed below, the storage subsystem 112 may implement one or more security features, such as a password protection feature and/or an encryption feature, for inhibiting unauthorized user access to the configuration files 120.

Although the configuration files 120 are stored on the storage subsystem 112 in their native file format in the illustrated embodiment, this aspect of the design is not essential. For example, in other embodiments of the invention, the configuration files 120 may be converted into one or more blocks of configuration information that are stored in a non-file format (e.g., in a data table) in the restricted memory area.

II. Example Process Flows (FIGS. 2 and 3)

Figure 2:
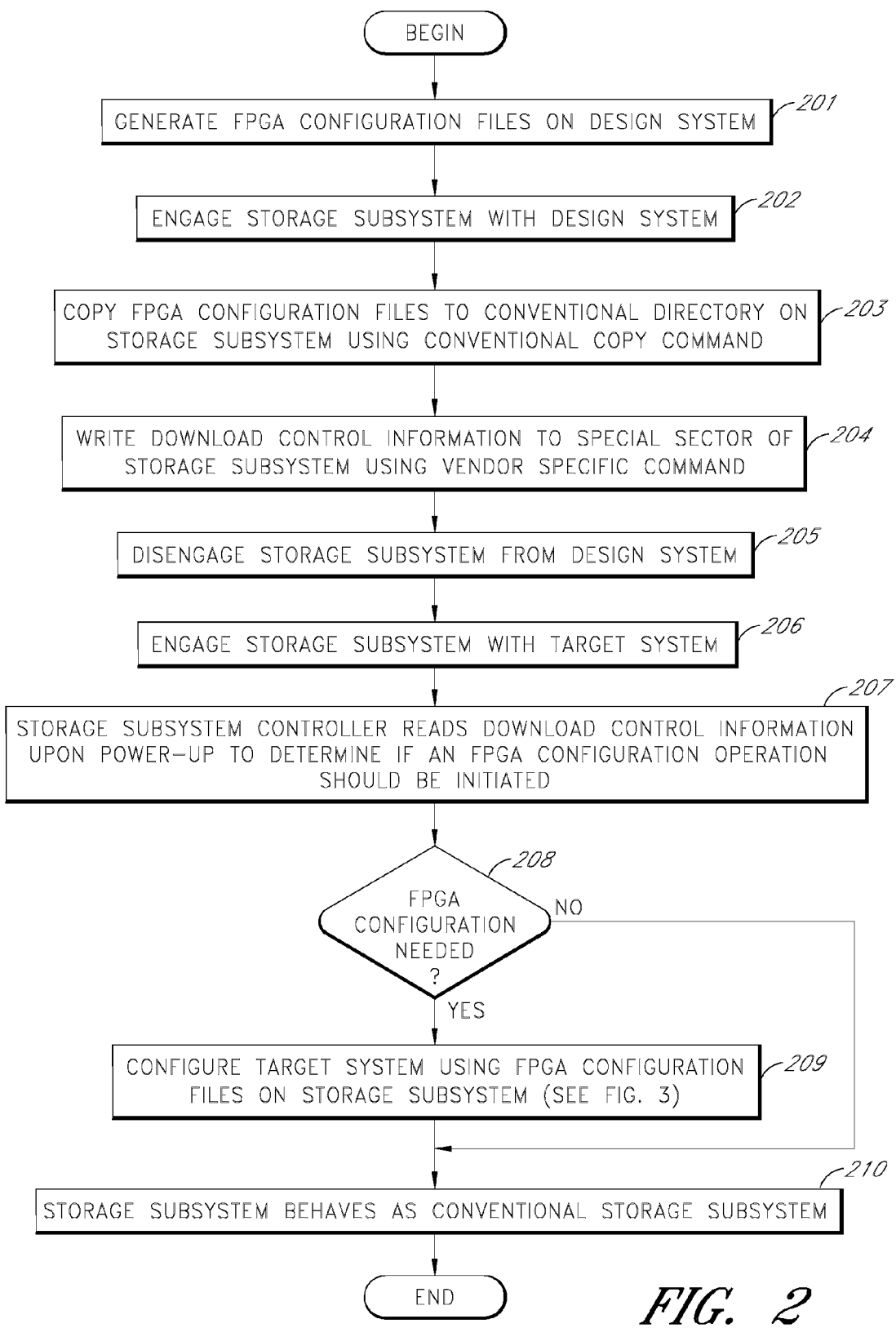
FIG. 2 illustrates a process for configuring the storage subsystem, and then using the storage subsystem to configure the target system.
Figure 3:
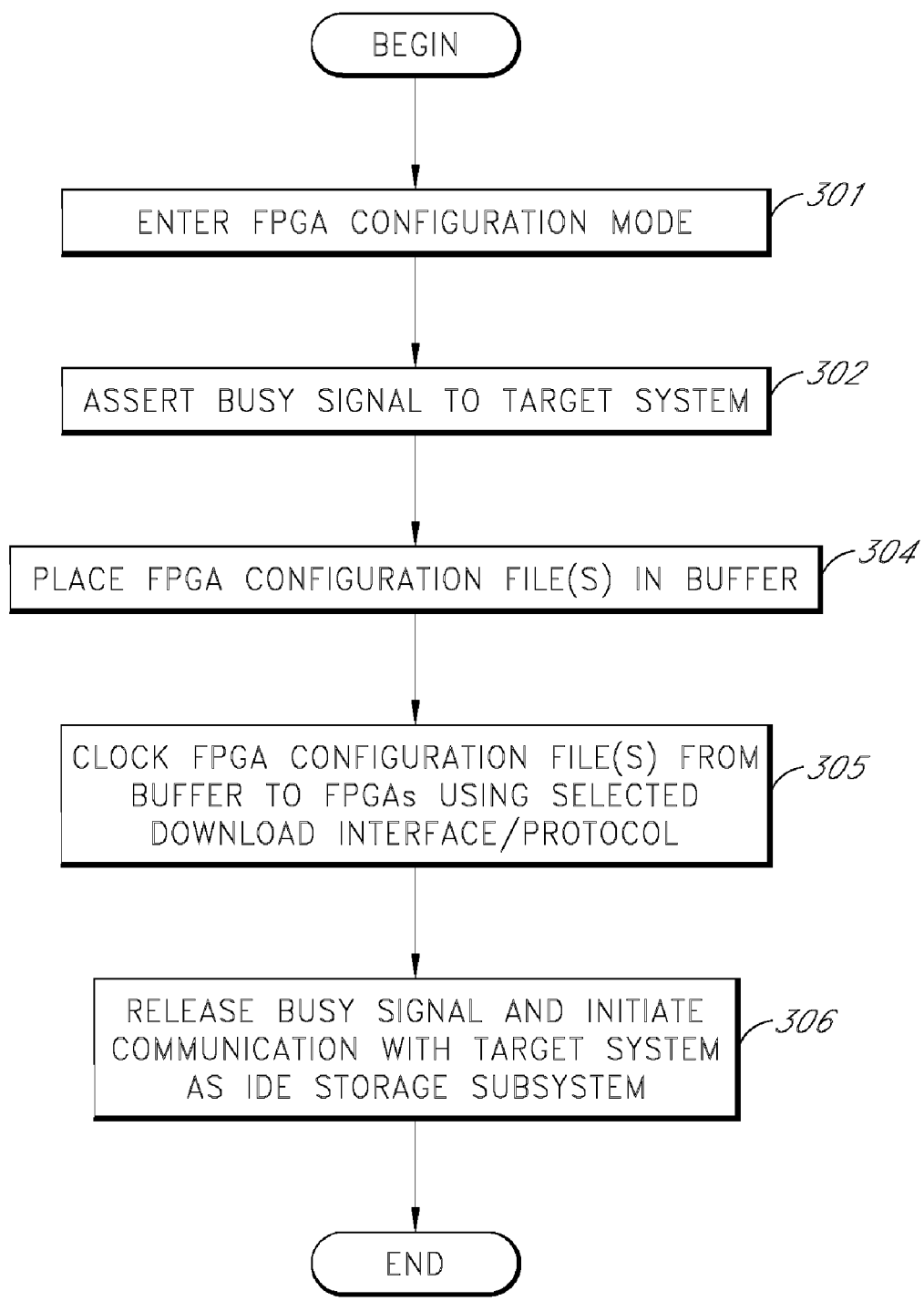
FIG. 3 illustrates a process that may be performed by the storage subsystem to program one or more FPGAs of the target system.

FIG. 2 illustrates a sample process for configuring a target system 100 as described above using the storage subsystem 112 and design system 152. In step 201, the design system 152 is used to generate one or more FPGA configuration files 120 that specify the logic circuitry to be implemented by the target system's FPGA(s) 102. Next, the storage subsystem 112 is connected to the design system in step 202, and the FPGA configuration files 120 are copied to the user data area of the storage subsystem 112. The configuration files may be copied to a specific file system directory used for FPGA configuration.

In step 204, the configuration utility 160 uses one or more vendor-specific commands to write the download control information 122 to the restricted memory area of the storage subsystem 112. As mentioned above, the configuration utility 160 may generate the download control information 122 based on user input regarding the FPGA(s) to be configured, as well as information about the configuration files. The download control information may alternatively be written to the user data area, either as one or more separate files or as part of the configuration file(s).

The storage subsystem 112 is then disengaged from the design system 152 in step 205 and connected to the target system 100 in step 206. When the storage subsystem 112 is powered up via a power signal supplied by the target system 100, the storage subsystem's controller 114 in step 207 checks the restricted memory area for the download control information 122 to determine whether an FPGA configuration operation should be initiated. If no download control information 120 is present, or if download control information is present but indicates that no configuration operation should be initiated, the process jumps to step 210, and the storage subsystem 112 immediately begins to behave as an IDE-based storage subsystem (e.g. an ATA disk drive).

In step 208, if the controller 114 determines that an FPGA configuration operation should be initiated, then in step 209 the storage subsystem 112 uses the appropriate FPGA download interface (as specified by the download control information) to download the FPGA configuration file(s) 120 to the target system's FPGA(s) 102. This download process is illustrated in FIG. 3, discussed below. Once the configuration operation is complete, the storage subsystem 112 in step 210 begins to behave as an IDE/ATA storage subsystem. If the storage subsystem 112 is connected to a host computer system that is not a valid target system 100, the attempt to download the configuration files 120 will fail in step 209, and the storage subsystem 112 will then behave as an IDE/ATA storage device.

In certain embodiments, the target system 100 may rewrite or otherwise update the configuration information stored on the storage subsystem 112, including the FPGA configuration files 120 and the download control information 122, thereby allowing for a field update of the FPGAs 102. For example, a target system 100 may receive updated FPGA configuration files 120 via a network connection (not shown). The target system 100 may then replace the configuration files 120 in the storage subsystem 112 with the updated FPGA configuration files. The power to the storage subsystem 112 may then be recycled, such as by disconnecting and reconnecting the storage subsystem 112. The storage subsystem 112 may then proceed with automatically updating the configuration of the FPGAs 102 using the updated FPGA configuration files, such as by proceeding from step 207 in FIG. 2.

FIG. 3 illustrates the steps performed by the storage subsystem 112 to configure the target system 100 in block 209 of FIG. 2. These steps are preferably embodied in the FPGA download firmware 132 (FIG. 1) executed by the controller 114. In this example, it is assumed that the target system has multiple FPGAs 102.

In step 301, the controller 114 places the storage subsystem 112 into an FPGA configuration mode. While in this mode, the storage subsystem 112 uses the data transfer protocol of the FPGA download interface specified by the download control information 122 to communicate with the FPGAs. Next, in step 302, the storage subsystem 112 asserts a busy signal to the interface controller 144 of the target system 100 to prevent the IDE-based communications from occurring between the storage subsystem 112 and the target system. This effectively frees some of the signal lines passed via the connectors 106, 113 for use as FPGA download interface signal lines. Any appropriate mapping function may be used to map a subset of the connector signal lines to the download interface signal lines of the FPGAs, and different mappings may be used for different types and brands of FPGAs.

In step 304, the FPGA configuration files 120 are placed in the buffer 116 of the storage subsystem 112 so that they may be streamed/clocked to the FPGAs 102. The configuration data represented in the FPGA configuration files 120 is then serially clocked out from the buffer 116 and into the FPGAs 102 in accordance with the protocol of the selected FPGA download interface. The storage subsystem 112 communicates directly with the FPGAs 102 during this process. If the FPGAs 102 are connected in a daisy chain configuration as illustrated, the configuration data is streamed serially to the first FPGA in the chain. Once the configuration data has been clocked into the FPGA(s), the storage subsystem 112 may read back and verify this data; this may be accomplished via the firmware executed by the storage subsystem's controller 114.

Once the FPGAs 102 have been configured and are operational, in step 306 the storage subsystem 112 de-asserts its busy signal to the interface controller 110, and communicates with the target system 100 as an ATA storage subsystem. Appropriate circuitry may be included in the target system 100 to isolate the FPGAs 102 from the interface controller 110 lines while the storage subsystem is in this mode.

Examples download interfaces/protocols that may be implemented by storage subsystem 112 to configure Xilinx FPGAs are described in the Virtex-5 Series Configuration Architecture User Guide (UG191), available at http://www.xilinx.com/bvdocs/userguides/ug191.pdf, the disclosure of which is hereby incorporated by reference. Examples of download interfaces and protocols that may be implemented by storage subsystem 112 to configure Altera FPGAs are described in the Altera Configuration Handbook, Volumes 1 (CF5V1-2.4) and 2 (CF5V2-2.3), available from Altera Corporation and at www.altera.com/literature/hb/cfg/config_handbook.pdf, the disclosures of which are hereby incorporated by reference.

III. Configuration of FPGA to Implement Interface Controller

With reference to FIG. 1, the interface controller 110 may optionally be implemented in an FPGA 102 of the target system 100, rather than separately. This may be accomplished by including the interface controller circuitry in the FPGA configuration files 120 streamed to the FPGAs. With this approach, once the configuration operation is complete, the first FPGA 102 in the daisy chain (if multiple FPGAs are included) would be capable of sending ATA storage commands (received from the processor 111) to the storage subsystem 112 in accordance with appropriate signal interface (USB, CF, PCMCIA, SATA, etc.).

IV. Protection of Configuration Data

The storage subsystem 112 may implement one or more security features to protect the configuration data it stores. For example, as mentioned above, the configuration files 120 may optionally be stored on the storage subsystem 112 in an encrypted form to protect trade secrets. For instance, the subsystem configuration utility 160 (FIG. 1) may encrypt these files 120 prior to or during transfer to the storage subsystem 112, or the storage subsystem may encrypt these files as they are received.

To further inhibit access to trade secrets, the configuration files 120 may be transferred to the target system 100 in encrypted form and then decrypted by the target system 100. For example, the storage subsystem 112 may initially partially configure one of the FPGAs 102 to implement a decryption circuit. This may be accomplished by sending appropriate (unencrypted) configuration data to this FPGA using partial configuration processes that are known in the art. Subsequently, as the storage subsystem 112 streams the encrypted configuration data 120 to the FPGAs, the decryption circuit would decrypt this data.

As another example of how the encrypted configuration files or data 120 may be transferred, the storage subsystem 112 may include an encryption key in its restricted space, and a microprocessor of the target system 100 may be programmed to retrieve this encryption key using a vendor-specific command. During the subsequent download process, this microprocessor could use the decryption key to decrypt the streamed configuration data.

The storage subsystem 112 may also implement a vendor-specific purge command for rapidly and reliably purging the non-volatile memory array, as described in U.S. patent application Ser. No. 11/458,336, filed on Jul. 18, 2006, the disclosure of which is hereby incorporated herein by reference. To make use of this feature, the target system 100 may be designed to detect intrusion attempts, and to issue a purge command to the storage subsystem 112 when such an intrusion attempt or other tampering event is detected. The purge operation may, but need not, be a destructive operation that physically destroys or damages the non-volatile memory array 112. The storage subsystem may also be configured to non-destructively purge the configuration file(s) 120 upon completion of the configuration process.

The storage subsystem 112 may also be designed to password-protect the configuration files 120, such that a user cannot read these files from the storage subsystem 112 without first entering a password on the host computer system. The password may be set by the configuration utility 160 (FIG. 1) via a vendor-specific command when the configuration files 120 are copied to the storage subsystem 112. Preferably, the password would not have to be entered to cause the storage subsystem 112 to stream the configuration files 120 to the target system 100.

Any two or more of the foregoing security features, as well as others, may be implemented in combination in the storage subsystem 112.

V. Additional Implementation Details and Variations

Some additional details of specific embodiments of the storage subsystem 112 will now be described with reference to FIG. 1. The storage subsystem 112 may, for example, be a solid-state memory card or drive that plugs into a slot or port of the target system 100. In certain embodiments, the memory card or drive complies with at least one of the following card specifications: CompactFlash, PCMCIA, SmartMedia, MultiMediaCard, SecureDigital, Memory Stick, ATA/ATAPI, PCI Express, PCI Mezzanine Card, and AdvancedTCA Mezzanine Card. The storage subsystem 112 may, for example, have a housing and signal interface that complies with one of the following specifications: sub 1 inch hard disk drive, 1.8 inch hard disk drive, 2.5 inch hard disk drive and 3.5 inch hard disk drive. A custom form factor and/or signal interface may alternatively be used.

In one embodiment, the controller 114 comprises an ATA flash disk controller that executes firmware The firmware executed by the controller 114 embodies functionality for implementing the features described herein, including providing access to the restricted memory area of the NVM array 118 via vendor-specific commands. The controller 114 may alternatively be implemented in-whole or in-part as an ASIC, FPGA, or other device that does not execute firmware.

The NVM array 118 may comprise, for example, flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM chips.

All possible combinations of the various features and characteristics described herein are contemplated, and are intended to fall within the scope of this disclosure.

While certain embodiments have been described, these embodiments have been presented by way of example only, and are not intended to be limiting. Indeed, the novel methods and systems described herein may be embodied in a variety of other forms, including forms that do not provide all of the benefits described herein. Furthermore, various omissions, substitutions and changes in the form of the disclosed methods and systems may be made without departing from the spirit of the invention. The invention is defined by the accompanying claims.

What is claimed is:

1. A storage subsystem, comprising:
a connector that enables the storage subsystem to be connected to an external connector of a target computer system having one or more field-programmable gate arrays (FPGAs), said one or more FPGAs implementing a download interface for receiving configuration information via a set of signal lines;
non-volatile storage having stored therein a FPGA configuration file for configuring the one or more FPGAs, the configuration file including configuration data for specifying logical circuitry to be implemented by the one or more FPGAs; and
a controller coupled to the connector and to the non-volatile storage, said controller configured to use configuration data in the FPGA configuration file stored in the non-volatile storage to program the one or more FPGAs when the storage subsystem is connected to the target computer system via said connector, said controller further configured to process storage access commands received via said connector;
wherein the storage subsystem is configured to program the one or more FPGAs by communicating directly with the one or more FPGAs in accordance with said download interface, to thereby cause the one or more FPGAs to be programmed to implement the logic circuitry, and the storage subsystem is configured to behave as a storage drive to the target computer system once programming of the one or more FPGAs is complete.

2. The storage subsystem of claim 1, wherein the controller is configured to serially stream the configuration data to the one or more FPGAs using said set of signal lines.

3. The storage subsystem of claim 1, wherein the controller implements a plurality of different download interfaces for programming FPGAs, and the non-volatile storage contains download control information specifying a particular one of said plurality of download interfaces to be used to program said one or more FPGAs.

4. The storage subsystem of claim 3, wherein the download control information is stored in a restricted area of the non-volatile storage, said restricted area being accessible via a vendor-specific ATA command.

5. The storage subsystem of claim 1, wherein the controller is configured to program the one or more FPGAs over a set of signal lines that are used for IDE-based communications with the target computer system when programming of the one or more FPGAs is complete.

6. The storage subsystem of claim 5, wherein the controller is configured to assert a BUSY signal to the target computer system during programming of the one or more FPGAs.

7. The storage subsystem of claim 1, wherein the FPGA configuration file is stored in a native file format of a design application for the FPGAs.

8. The storage subsystem of claim 1, wherein the FPGA configuration file is stored in the non-volatile storage in an encrypted form.

9. The storage subsystem of claim 1, wherein the controller implements a password protection feature, and the configuration file is stored in the non-volatile storage in a password protected form via said password protection feature.

10. The storage subsystem of claim 1, wherein the controller is configured via firmware to communicate with the one or more FPGAs using said download interface.

11. The storage subsystem of claim 1, wherein the controller comprises application-specific circuitry for communicating with the one or more FPGAs using said download interface.

12. The storage subsystem of claim 1, wherein the connector is a USB (Universal Serial Bus) connector.

13. The storage subsystem of claim 1, wherein the non-volatile storage consists of solid state storage.

14. The storage subsystem of claim 1, wherein the non-volatile storage comprises a disk drive.

15. The storage subsystem of claim 1, wherein the controller is configured, via executable program instructions represented in the non-volatile storage subsystem, to use the configuration file stored in the non-volatile storage to program the one or more FPGAs when the storage subsystem is connected to the target system via said connector and to process storage access commands received via said connector from the target computer system having one or more field-programmable gate arrays (FPGAs).

16. The storage subsystem of claim 1, wherein the controller is configured via application-specific circuitry to use the configuration file stored in the non-volatile storage to program the one or more FPGAs when the storage subsystem is connected to the target system via said connector and to process storage access commands received via said connector from the target computer system having one or more field-programmable gate arrays (FPGAs).

17. The storage subsystem of claim 1, wherein the logic circuitry specified by the configuration data includes interface controller circuitry to enable the one or more FPGAs to send storage access commands to the storage subsystem.

18. The storage subsystem of claim 1, wherein the controller is configured to process storage access commands via at least one signal line in the download interface, where the at least one signal line also transmitted the FPGA programming.

19. A method of using a non-volatile storage subsystem to configure a target system that includes at least one field-programmable device, the method comprising:
   initiating a connection between the non-volatile storage subsystem and the target system via an external connector of the target system, said non-volatile storage subsystem comprising a configuration controller and non-volatile storage containing configuration data for specifying logic circuitry to be implemented by the field-programmable device, said target system including no configuration controller for programming the field-programmable device;
   under control of the configuration controller, streaming the configuration data from the non-volatile storage subsystem via said connector to the field-programmable device using a download interface and protocol implemented by the field-programmable device to thereby cause the field-programmable device to be programmed to implement the logic circuitry; and
   behaving as a storage drive to the target system once streaming of the configuration data to the field-programmable device is complete.

20. The method of claim 19, wherein the field-programmable device is a field-programmable gate array (FPGA).

21. The method of claim 19, wherein the field-programmable device is one of a plurality of field-programmable devices of the target system that are programmed by the storage subsystem.

22. The method of claim 19, wherein streaming the configuration data comprises serially clocking the configuration data to the field-programmable device via said configuration controller.

23. The method of claim 19, further comprising asserting a BUSY signal to the target system during said streaming of the configuration data to prevent ATA communications between the non-volatile storage subsystem and the target system.

24. The method of claim 19, further comprising using download control information stored on the non-volatile storage to select between a plurality of possible download interfaces for communicating with the field-programmable device.

25. The method of claim 19, wherein the configuration data is stored in an encrypted form in the non-volatile storage, and the method further comprises decrypting the configuration data during programming of the field-programmable device.

26. The method of claim 19, wherein the non-volatile storage consists of solid state storage.

27. A target computer system, comprising:
   an external connector that enables a non-volatile storage subsystem to be connected to the target computer system;
   at least one field-programmable gate array (FPGA) connected directly to the connector via a set of signal lines through which the storage subsystem is configured to directly communicate with and program the FPGA with configuration data stored in a FPGA configuration file on the storage subsystem when the storage subsystem is connected to said connector, the configuration data in the FPGA configuration file specifying logic circuitry to be implemented by the at least one FGPA; and
   a processor coupled to the connector and capable of sending storage access commands to the storage subsystem after the at least one FPGA has been programmed by the FPGA configuration file.

28. The target computer system of claim 27, wherein the connector is a USB connector.

29. The target computer system of claim 27, wherein the connector is one of the following types of connectors: CompactFlash, Serial ATA, Parallel ATA, Firewire, PCMCIA, Secure Digital, PCI Express.

30. The target computer system of claim 27, wherein the processor is configured to execute operating system code stored on the storage subsystem.

31. The target computer system of claim 27, wherein the target computer system is configured to isolate the at least one FPGA from the connector after the at least one FPGA has been programmed by the FPGA configuration file.

32. The target computer system of claim 27, wherein the at least one FPGA is configured to implement interface controller circuitry for storage commands to the storage subsystem after the configuration operation is complete.

* * * * *